(12) United States Patent
Lin et al.

(10) Patent No.: US 9,098,848 B2
(45) Date of Patent: Aug. 4, 2015

(54) SAFETY COVER DESIGN FOR FINANCIAL TRANSACTION DEVICE

(71) Applicant: Castles Technology Co., Ltd, New Taipei (TW)

(72) Inventors: Hung-Chun Lin, Hsinchu (TW); Kai-Yu Cheng, Taipei (TW)

(73) Assignee: CASTLES TECHNOLOGY CO., LTD. (TW)

( * ) Notice: Subject to any disclaimer, the term of this patent is extended or adjusted under 35 U.S.C. 154(b) by 171 days.

(21) Appl. No.: 14/049,295

(22) Filed: Oct. 9, 2013

(65) Prior Publication Data

US 2015/0100484 A1      Apr. 9, 2015

(51) Int. Cl.
| | | |
|---|---|---|
| *H05K 5/00* | (2006.01) | |
| *H05K 7/00* | (2006.01) | |
| *G06Q 20/34* | (2012.01) | |
| *G06Q 20/38* | (2012.01) | |

(52) U.S. Cl.
CPC ............ *G06Q 20/341* (2013.01); *G06Q 20/382* (2013.01)

(58) Field of Classification Search
CPC ... G06F 1/1616; G06F 3/0362; H04M 1/0214
USPC .............. 361/679.01–679.09, 679.1–679.19, 361/679.21–679.29, 679.31–679.45, 361/679.55–679.6, 724–747
See application file for complete search history.

(56) References Cited

U.S. PATENT DOCUMENTS 6,670,893 B1 * 12/2003 Svarfvar .......................... 341/22
2005/0052425 A1 * 3/2005 Zadesky et al. ............... 345/173

* cited by examiner

*Primary Examiner* — Jerry Wu

(57) ABSTRACT

The present invention is a safety covering design for financial transaction device, simply constructing specific solid connection between boards by the pressure formed after assembly. The pressure is formed with assembly and constructing connection of units, so illegally penetration can be easily detected, because the pressure is released by disassembly as well as the connection between boards is removed. Thus, the financial transaction device of the present invention is not easy being penetrated without alarm.

9 Claims, 11 Drawing Sheets

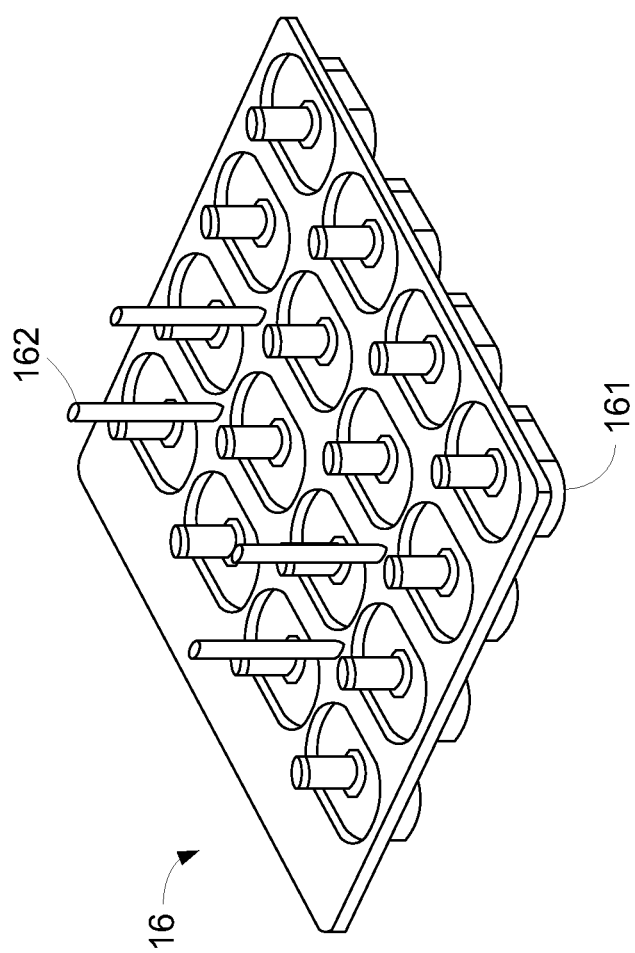

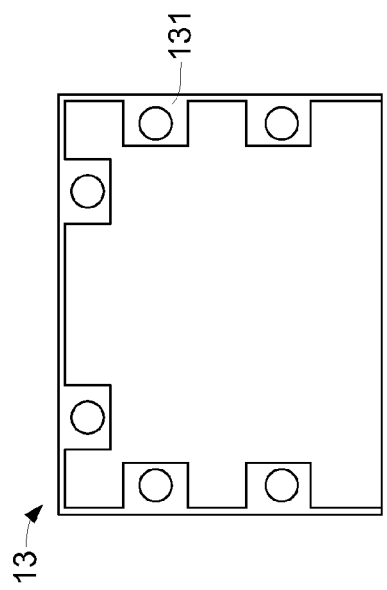
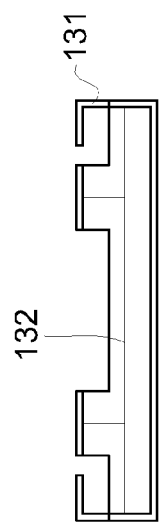
FIG.7A
FIG.7B

SAFETY COVER DESIGN FOR FINANCIAL TRANSACTION DEVICE

BACKGROUND OF THE INVENTION

1. Field of the Invention

The present invention relates to a safety cover design for financial transaction device, and more particularly to the integrated circuits card reader having safety cover design for preventing penetrating, exploiting and manipulating to protect the information stored in financial transaction device from illegal accessing.

2. Description of Related Art

Integrated circuit card also well-known as smart card, is being used widely today to meet the convenient of the information exchange provided by electrical system. Integrated circuit card has various types practiced in many fields. Bank card or credit card can be used in financial transaction. ID card can be used for confirming individual identity. Other fields like travel, communication, and medical system are also involved integrated circuit card implementation. Integrated circuit card can store amount of individual information, and access conveniently based transaction discrepancies.

The individual information stored in the integrated circuit card is access during certain transaction including cash withdraw, money transfer, consumer credit, cumulative dividend and micropayment. Several types of integrated circuit card are recognized in different payment. Bank card used for cash withdraw and money transfer has magnetic stripe formed on surface. Metro card mostly completes payment through wireless. Combo card combines with magnetic stripe and wireless unit, and being used in variety payment with security code. Integrated circuit card has been used in many transaction rather than cash, and common current payment of the majority. However, the convenient and widely used in common life brought by integrated circuit card, also increase stealing risk of personal credit information exposed during transaction. The stealing of personal credit information can cause personal property or financial lose.

Financial transaction device is the key media for transaction of integrated circuit card. The financial transaction device can read information stored in integrated circuit card through magnetic stripe or wireless, and process financial transaction. At present, combo financial transaction device is common everywhere, which can read information through magnetic stripe and wireless, provide security code confirmation as well. However, the financial transaction device has a lot of weak point. Information stealing module can be disposed in financial transaction device by hacker just simply disassemble the cover, for example, drilling a hole. And assemble the cover back to cover the change. Then the information stored in integrated circuit card can be stolen by the stealing device implemented in financial transaction device during transaction by hacker. As a result, the stolen information is used to make fake card, hacker can access or transfer money from the fake card. The fake card makes cash flow out of balance, effects supply and demand in market, the personal financial losing as well. The security of financial transaction device is regarded as main development, especially the protection of personal credit information which is trying to avoid financial lose and keep order of financial transaction.

In view of the aforementioned drawbacks of the conventional financial transaction device, the inventor of the present invention based on years of practice experience in the related industry to conduct extensive researches and experiments, and finally developed a safety cover design for financial transaction device in accordance with the present invention to overcome the drawbacks of the prior art.

SUMMARY OF THE INVENTION

Therefore, it is a primary objective of the invention to provide a safety covering design for financial transaction device, utilizing the pressure between the boards to build the specific connection and form a safety covering design for financial transaction device. The penetration can cause pressure releasing, and the connection between the boards is destroyed, then the penetration is detected by the present invention immediately, so the financial transaction device can prevent penetration successfully.

Also, it is a second objective of the invention to provide a safety covering design for financial transaction device, the pressure between the boards can be formed naturally by normal assembly, and any penetration is always detected immediately, so the safety covering design can prevent exploiting or manipulating easily To achieve the aforementioned objective, the present invention provides a safety covering design for financial transaction device, comprising: a lower housing; a circuit board, being disposed in the lower housing, having a plurality of first button unit and a protection circuit; a button pressing board, being disposed on the circuit board, having a plurality of second button unit, a plurality of first contacting point and a plurality of first pressing point; wherein each second button unit with raised surface is on the first button unit when the button pressing board is on the circuit board, and the second button unit presses the first button unit with pressure on the second button unit; moreover, the first pressing point is conductive, and contacts the protection circuit with pressure on the first pressing point; a first protection board, being disposed on the button pressing board, having a plurality of clamping point, a plurality of second pressing point and a first electrical circuit; wherein each clamping point is on the first contacting point of the button pressing board when the first protection board is on the button pressing board, so the clamping points are pushed by the first contacting points of the button pressing board with pressure on the first protection board; moreover, each second pressing point presses the first pressing point with pressure on the second pressing point, so the first electrical circuit is conductive with the protection circuit; wherein the first electrical circuit is connected to the second pressing point; a second protection board, being disposed on the first protection board, having a plurality of second contacting point, a plurality of first hole, a second electrical circuit and a plurality of second hole; wherein each second contacting point is on the clamping point, and each second hole is on the second button unit when the second protection board is on the first protection board; wherein each clamping point is pushed by the first contacting points and is contacted with the second contacting point as pressure on the second protection board and the first protection board, so the first electrical circuit is conductive with the second electrical circuit; wherein each first hole is on the second pressing point when the second protection board is on the first protection board; a rubber keyboard, being disposed on the second protection board, having a plurality of rubber button and a plurality of pressing column; wherein each rubber button is on the second button unit, so the rubber button can pass through the second hole and press the second button unit, then the second button unit presses the first button unit with pressure on the second button unit; wherein the pressing columns are formed under the rubber keyboard, and pass through the first hole; and an upper housing, being disposed on the rubber keyboard and combining with the lower housing; wherein the rubber keyboard is pressed by the upper housing, and the pressing columns of the rubber keyboard press the second pressing points, then the first pressing points pressed by the second pressing points contact the protection circuit, so the first electrical circuit is conductive with the protection circuit; wherein when the clamping point and the second contacting point keep contactless, the first electrical circuit and the second electrical circuit are formed open-circuit; wherein when the pressure on the first pressing point is released, the first electrical circuit and the protection circuit are formed open circuit.

Wherein the safety covering design for financial transaction device, further includes a card shield; wherein the card shield has a plurality of clamping unit and a shield circuit, and contacts the circuit board with a zebra; each clamping unit passes through the circuit board, and clamps on the clamping point, so the clamping points stick on the first contacting point, and the first protection board fixes on the circuit board solidly with the button pressing board; the shield circuit connects to the breaking detect circuit of the circuit board through the zebra; wherein an integrated circuit card connector is able to dispose between the circuit board and the card shield.

BRIEF DESCRIPTION OF THE DRAWINGS

FIG. 6 demonstrates top view of the rubber keyboard in accordance with the present invention.

FIG. 7A demonstrates top view of the card shield in accordance with the present invention.

FIG. 7B demonstrates side view of the card shield in accordance with the present invention.

DETAILED DESCRIPTION OF THE PREFERRED EMBODIMENTS

The technical contents and characteristics of the present invention will be apparent with the detailed description of a preferred embodiment accompanied with related drawings as follows. It is noteworthy that the drawings are provided for the purpose of illustrating the present invention, but not intended for limiting the scope of the invention.

Figure 1:
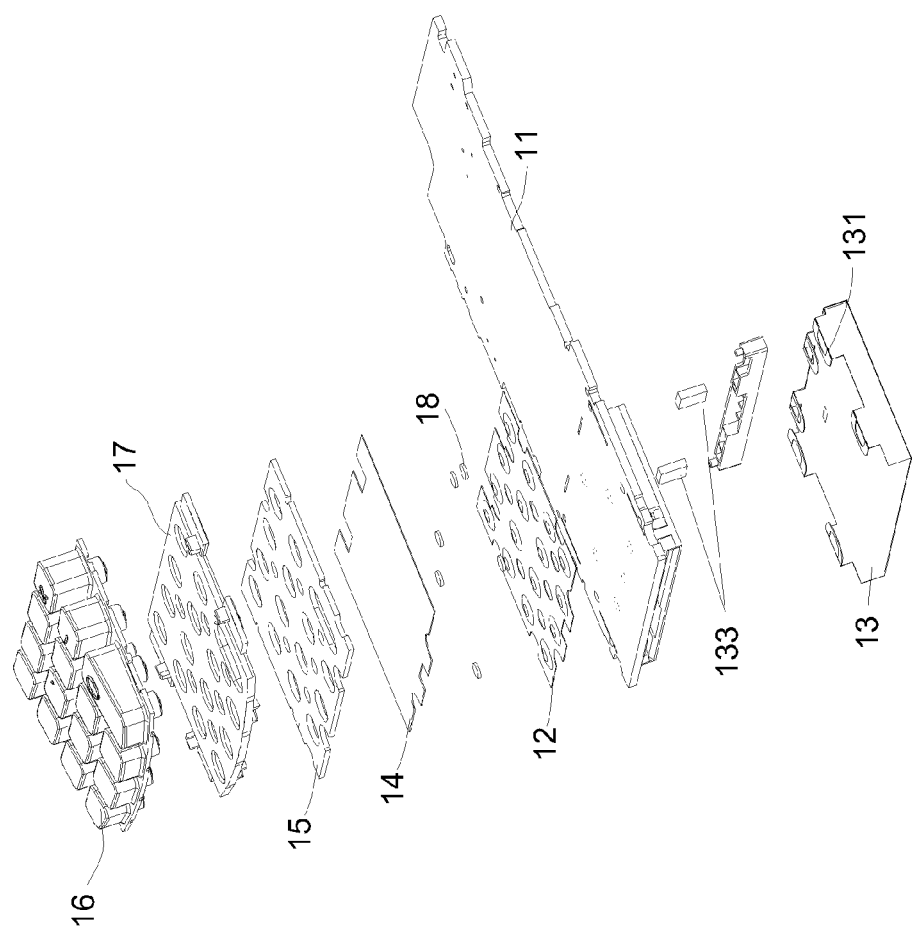
FIG. 1 demonstrates exploded view of the safety covering design for financial transaction device in accordance with the present invention.
Figure 2:
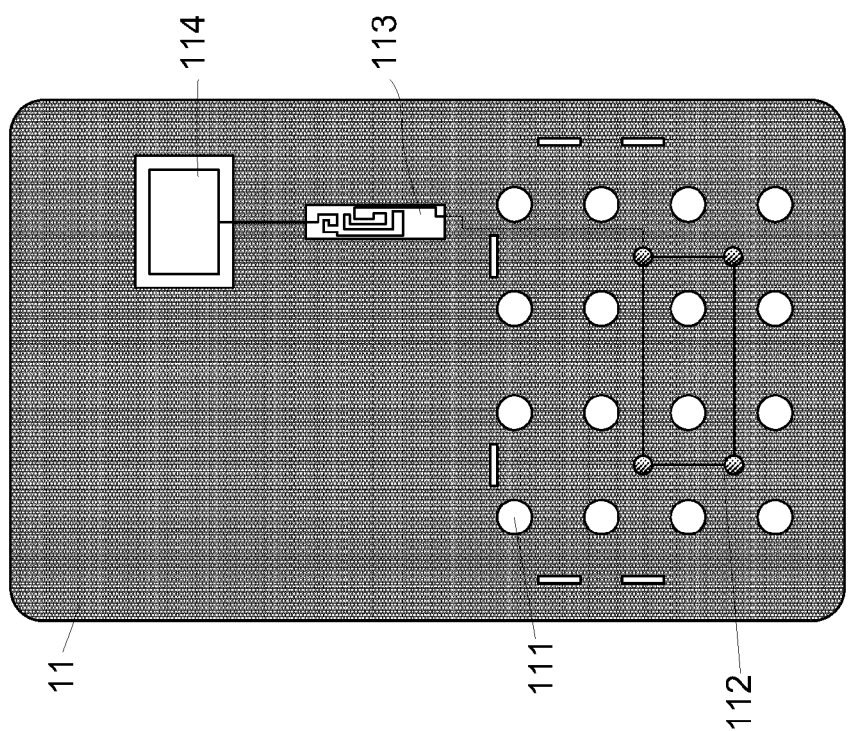
FIG. 2 demonstrates top view of circuit board in accordance with the present invention.
Figure 3:
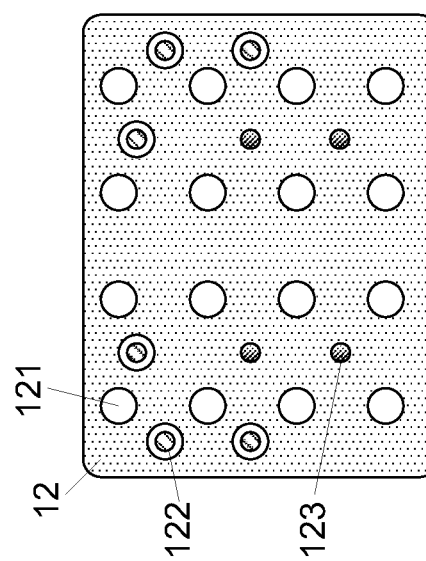
FIG. 3 demonstrates top view of button pressing board in accordance with the present invention.
Figure 4:
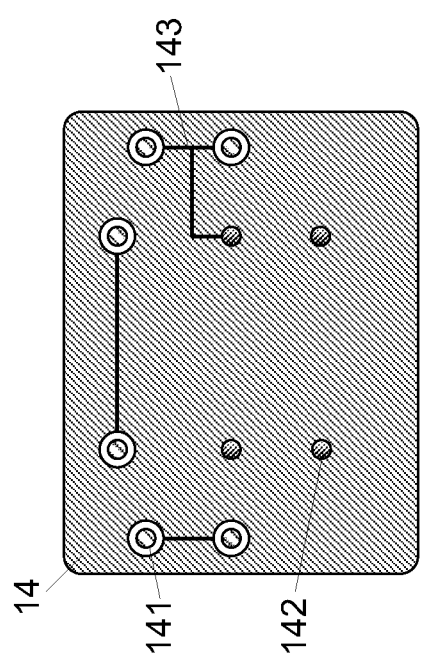
FIG. 4 demonstrates top view of first protection board in accordance with the present invention.
Figure 5:
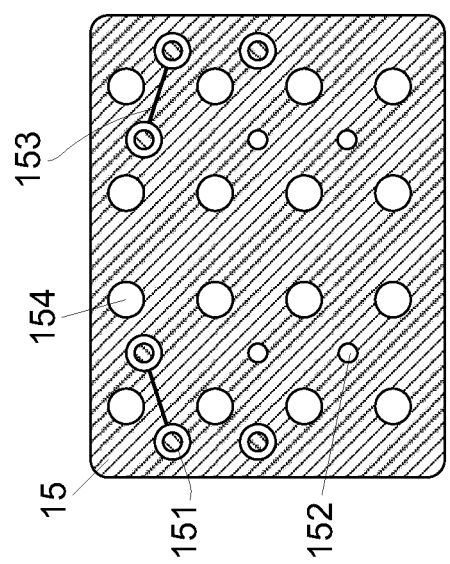
FIG. 5 demonstrates top view of the second protection board in accordance with the present invention.

Please refer to FIGS. 1 to 6 and 7A, 7B, wherein the FIG. 1 demonstrates exploded view of the safety covering design for financial transaction device in accordance with the present invention, FIG. 2 demonstrates top view of circuit board in accordance with the present invention, FIG. 3 demonstrates top view of button pressing board in accordance with the present invention, FIG. 4 demonstrates top view of first protection board in accordance with the present invention, FIG. 5 demonstrates top view of the second protection board in accordance with the present invention, FIG. 6 demonstrates top view of the rubber keyboard in accordance with the present invention, FIG. 7A demonstrates top view of the card shield in accordance with the present invention, and FIG. 7B demonstrates side view of the card shield in accordance with the present invention. With reference to FIG. 1 to 6, the present invention is a safety covering design for financial transaction device, and comprises: a lower housing 21; a circuit board 11, being disposed in the lower housing 21, having a plurality of first button unit 111 and a protection circuit 112; a button pressing board 12, being disposed on the circuit board 11, having a plurality of second button unit 121, a plurality of first contacting point 122 and a plurality of first pressing point 123; wherein each second button unit 121 with raised surface is on the first button unit 111 when the button pressing board 12 is on the circuit board 11, and the second button unit 121 presses the first button unit 111 with pressure on the second button unit 121; moreover, the first pressing point 123 is conductive, and contacts the protection circuit 112 with pressure on the first pressing point 123; a first protection board 14, being disposed on the button pressing board 12, having a plurality of clamping point 141, a plurality of second pressing point 142 and a first electrical circuit 143; wherein each clamping point 141 is on the first contacting point 122 of the button pressing board 12 when the first protection board 14 is on the button pressing board 12, so the clamping points 141 are pushed by the first contacting points 122 of the button pressing board 12 with pressure on the first protection board 14; moreover, each second pressing point 142 presses the first pressing point 123 with pressure on the second pressing point 142, so the first electrical circuit 143 is conductive with the protection circuit 112; wherein the first electrical circuit 143 is connected to the second pressing point 142; a second protection board 15, being disposed on the first protection board 14, having a plurality of second contacting point 151, a plurality of first hole 152, a second electrical circuit 153 and a plurality of second hole 154; wherein each second contacting point 151 is on the clamping point 141, and each second hole 154 is on the second button unit 121 when the second protection board 15 is on the first protection board 14; wherein each first hole 152 is on the second pressing point 142 when the second protection board 15 is on the first protection board 14; a rubber keyboard 16, being disposed on the second protection board 15, having a plurality of rubber button 161 and a plurality of pressing column 162; wherein each rubber button 161 is on the second button unit 121, so the rubber button 161 can pass through the second hole 154 and press the second button unit 121, then the second button unit 121 presses the first button unit 111 with pressure on the second button unit 121; wherein the pressing columns 162 are formed under the rubber keyboard 16, and pass through the first hole 152; and an upper housing 22, being disposed on the rubber keyboard 16 and combining with the lower housing 21. The first electrical circuit 143 and the protection circuit 112 are formed open circuit as the pressure on the first pressing point 123 is released.

Figure 8:
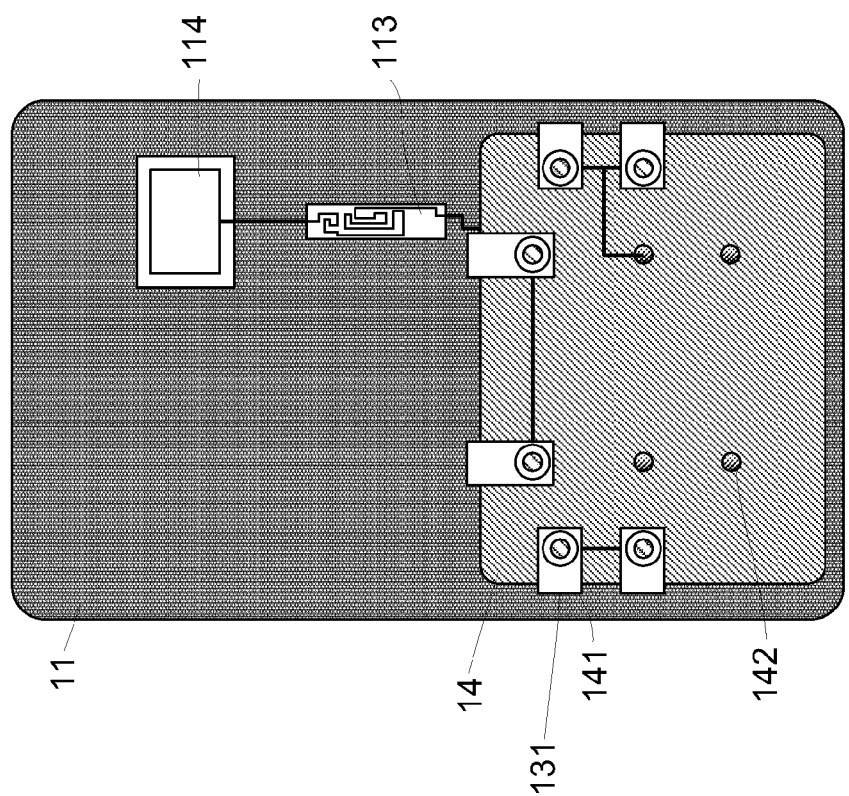
FIG. 8 demonstrates top view of the button pressing board fixed on the circuit board in accordance with the present invention.

With reference to FIGS. 3, 7A, 7B and 8, wherein FIG. 8 demonstrates top view of the button pressing board fixed on the circuit board in accordance with the present invention. The safety covering design for financial transaction device in accordance with the present invention further includes a card shield 13; wherein the card shield 13 has a plurality of clamping unit 131 and a shield circuit 132, and contacts the circuit board 11 with a zebra 133; each clamping unit 131 passes through the circuit board 11, and clamps on the clamping point 141, so the clamping points 141 stick on the first contacting point 122, and the first protection board 14 fixes on the circuit board 11 solidly with the button pressing board 12; the shield circuit 132 connects to the breaking detect circuit 113 of the circuit board 11 through the zebra 133. An integrated circuit card connector is able to dispose between the circuit board 11 and the card shield 13. The card shield 13 is flexible printed circuits. The clamping units 131 pass through the circuit board 11, and clamp on the clamping points 141. The clamping units 131 are unable to be loosed from the clamping points 141 without removing the first protection board 14 and the second protection board 15, unless the card shield 13 is took off straightly by penetration and destruction. The pressure between the circuit board 11 and the button pressing board 12 is released when the first protection board 14 and the second protection board 15 are removed, and alarm is triggered. Thus, the card shield 13 is unable to be took off without penetration, so the integrated circuit card connector disposed in the card shield 13 is hardly to be exploited.

Figure 9:
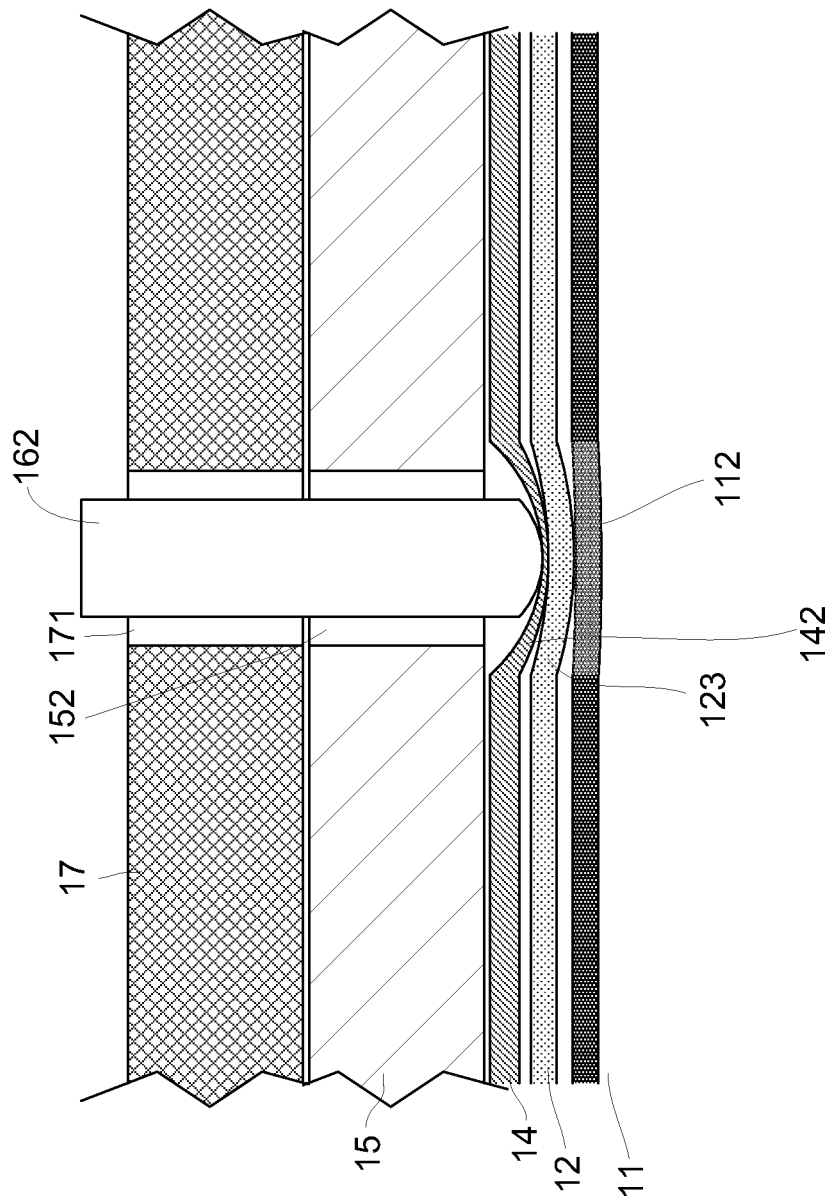
FIG. 9 demonstrates side view of the safety covering design for financial transaction device in accordance with the present invention.

Please refer to FIG. 1 and FIG. 9, wherein FIG. 9 demonstrates side view of the safety covering design for financial transaction device in accordance with the present invention. a light guide plate 17 is disposed between the rubber keyboard 16 and the second protection board 15 to increase pressure on the second protection board 15, and has a plurality of third holes 171 and a plurality of fourth holes 172; each third hole 171 is on the first hole 152 and each fourth hole 172 is on the second hole 154 when the light guide plate 17 is on the second protection board 15.

With reference to FIG. 1 and FIG. 9. The safety covering design for financial transaction device accordance with the present invention utilizes the pressure and contact formed between the boards to avoid penetration and destruction as well as exploiting or manipulating. After the lower housing 21 combines with the upper housing 22, the rubber keyboard 16 is pressed by the upper housing 22, and the pressing columns 162 of the rubber keyboard 16 press the second pressing points 142, then the first pressing points 123 pressed by the second pressing points 142 contact the protection circuit 112, so the first electrical circuit 143 is conductive with the protection circuit 112; thus, the pressing columns 162 of the rubber keyboard 16 are took off from the second pressing points 142 when the upper housing 22 is removed, and the second pressing points 142 press no pressure on the first pressing points 123, so the first pressing points 123 can never contact the protection circuit 112.

With reference to FIG. 1, a plurality of cushion 18 are disposed between the first contacting point 122 of the button pressing board 12 and the clamping point 141 of the first protection board 14. The cushion 18 in terms of a pad form is conductive, offering buffer between the first contacting point 122 and the clamping point 141, and for more significant function, is to provide solid contact between the first contacting point 122 and the clamping point 141.

Figure 10:
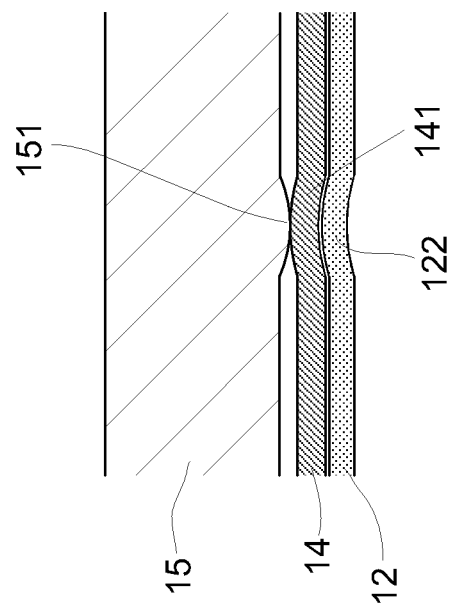
FIG. 10 demonstrates another side view of the safety covering design for financial transaction device accordance with the present invention.

With reference to FIG. 3 to FIG. 5 and FIG. 10, wherein FIG. 10 demonstrates another side view of the safety covering design for financial transaction device accordance with the present invention. The first contacting points 122 is raised on the button pressing board 12, and the first protection board 14 is flexible printed circuits. Each clamping point 141 is pushed by the first contacting points 122 and is contacted with the second contacting point 151 as pressure on the second protection board 15 and the first protection board 14, so the first electrical circuit 143 is conductive with the second electrical circuit 153. Therefore, the clamping point 141 and the second contacting point 151 keep contactless and non-conducting without pressure on the second protection board 15 and the first protection board 14 as the upper housing 22 separates from the lower housing 21, and the first electrical circuit 143 and the second electrical circuit 153 are formed open-circuit.

With reference to FIG. 1 to 6, the financial transaction device can detect penetration immediately in terms of hacking and exploiting by the safety covering design, wherein the financial transaction device determines the upper housing 22 is separated from the lower housing 21 when one first pressing point 123 and the protection circuit 112 are contactless or the first electrical circuit 143 disconnects from the second electrical circuit 153. Please refer to FIG. 2, the financial transaction device in accordance with the present invention further includes a breaking detect circuit 113 and a main processor 114, the breaking detect circuit 113 connects the protection circuit 112, the main processor 114, the first electrical circuit 143 and the second electrical circuit 153; the main processor 114 can detect open-circuit in any of the protection circuit 112, the first electrical circuit 143 and the second electrical circuit 153 through the breaking detect circuit 113, then sends message to any security center through cable internet or wireless internet. The security center receives message and determine the upper housing 22 has been separated from lower housing 21 or the financial transaction device is exploited and unsafe, then initiates proper safety procedure, for example, turning off the financial transaction device or instructing the financial transaction device stop reading any information.

Figure 11:
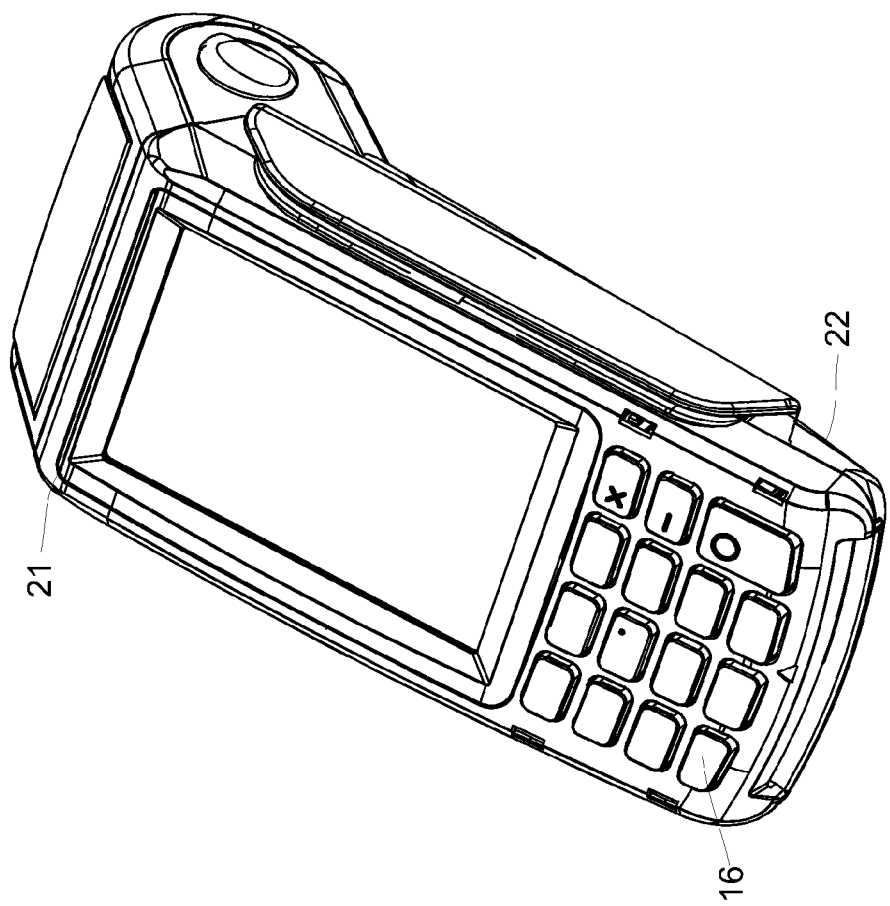
FIG. 11 demonstrates stereo view of the safety covering design for financial transaction device after assembly in accordance with the present invention.

Please refer to FIG. 11, which demonstrates stereo view of the safety covering design for financial transaction device after assembly in accordance with the present invention. The rubber keyboard 16 can be seen after the upper housing 22 combining with the lower housing 21. Monitor is shown on the upper housing 22, able to display the status of the financial transaction device, especially alarm message.

In summation, a safety covering design for financial transaction device in accordance with the present invention is disclosed clearly and sufficiently by the foregoing preferred embodiments, and the advantages of the present invention can be broke down as below:

(1) the present invention utilizes the pressure between the boards to build the specific connection and form a safety covering design for financial transaction device. The specific connection built by the pressure between the boards is important. The penetration can cause pressure releasing, and the connection between the boards is destroyed, then the illegally penetration is detected by the present invention immediately, so the financial transaction device can prevent illegally penetration successfully.

(2) the pressure between the boards of the present invention can be formed naturally by normal assembly, and any illegally penetration is always detected immediately, so the safety covering design can prevent exploiting or manipulating easily.

While the invention has been described by means of specific embodiments, numerous modifications and variations could be made thereto by those skilled in the art without departing from the scope and spirit of the invention set forth in the claims.

What is claimed is:

1. A safety covering design for financial transaction device, comprising:

a lower housing;

a circuit board, being disposed in the lower housing, having a plurality of first button unit and a protection circuit;

a button pressing board, being disposed on the circuit board, having a plurality of second button unit, a plurality of first contacting point and a plurality of first pressing point; wherein each second button unit with raised surface is on the first button unit when the button pressing board is on the circuit board, and the second button unit presses the first button unit with pressure on the second button unit;

moreover, the first pressing point is conductive, and contacts the protection circuit with pressure on the first pressing point;

a first protection board, being disposed on the button pressing board, having a plurality of clamping point, a plurality of second pressing point and a first electrical circuit; wherein each clamping point is on the first contacting point of the button pressing board when the first protection board is on the button pressing board, so the clamping points are pushed by the first contacting points of the button pressing board with pressure on the first protection board; moreover, each second pressing point presses the first pressing point with pressure on the second pressing point, so the first electrical circuit is conductive with the protection circuit;

wherein the first electrical circuit is connected to the second pressing point;

a second protection board, being disposed on the first protection board, having a plurality of second contacting point, a plurality of first hole, a second electrical circuit and a plurality of second hole; wherein each second contacting point is on the clamping point, and each second hole is on the second button unit when the second protection board is on the first protection board; wherein each clamping point is pushed by the first contacting points and is contacted with the second contacting point as pressure on the second protection board and the first protection board, so the first electrical circuit is conductive with the second electrical circuit;

wherein each first hole is on the second pressing point when the second protection board is on the first protection board;

a rubber keyboard, being disposed on the second protection board, having a plurality of rubber button and a plurality of pressing column; wherein each rubber button is on the second button unit, so the rubber button can pass through the second hole and press the second button unit, then the second button unit presses the first button unit with pressure on the second button unit; wherein the pressing columns are formed under the rubber keyboard, and pass through the first hole; and an upper housing, being disposed on the rubber keyboard and combining with the lower housing; wherein the rubber keyboard is pressed by the upper housing, and the pressing columns of the rubber keyboard press the second pressing points, then the first pressing points pressed by the second pressing points contact the protection circuit, so the first electrical circuit is conductive with the protection circuit;

wherein when the clamping point and the second contacting point keep contactless, the first electrical circuit and the second electrical circuit are formed open-circuit;

wherein when the pressure on the first pressing point is released, the first electrical circuit and the protection circuit are formed open circuit.

2. The safety covering design for financial transaction device of claim 1, wherein the first contacting points is raised on the button pressing board.

3. The safety covering design for financial transaction device of claim 1, wherein a light guide plate is disposed between the rubber keyboard and the second protection board to increase pressure on the second protection board, and has a plurality of third holes and a plurality of fourth holes; each third hole is on the first hole and each fourth hole is on the second hole when the light guide plate is on the second protection board.

4. The safety covering design for financial transaction device of claim 1, wherein the circuit board further includes a breaking detect circuit and a main processor, the breaking detect circuit connects the protection circuit, the main processor, the first electrical circuit and the second electrical circuit; the main processor can detect open-circuit in any of the protection circuit, the first electrical circuit and the second electrical circuit through the breaking detect circuit.

5. The safety covering design for financial transaction device of claim 1, wherein the first protection board comprises flexible printed circuits.

6. The safety covering design for financial transaction device of claim 4, further including a card shield; wherein the card shield has a plurality of clamping unit and a shield circuit, and contacts the circuit board with a zebra; each clamping unit passes through the circuit board, and clamps on the clamping point, so the clamping points stick on the first contacting point, and the first protection board fixes on the circuit board solidly with the button pressing board; the shield circuit connects to the breaking detect circuit of the circuit board through the zebra.

7. The safety covering design for financial transaction device of claim 6, wherein an integrated circuit card connector is able to dispose between the circuit board and the card shield.

8. The safety covering design for financial transaction device of claim 6, wherein the card shield comprises flexible printed circuits.

9. The safety covering design for financial transaction device of claim 1, wherein a plurality of cushion are disposed between the first contacting point of the button pressing board and the clamping point of the first protection board.

* * * * *